United States Patent Office 2,845,418
Patented July 29, 1958

2,845,418
CYANINE DYESTUFFS

John David Kendall and George Frank Duffin, Ilford, England, assignors to Ilford Limited, Ilford, England, a British company No Drawing. Application November 25, 1955
Serial No. 549,180

Claims priority, application Great Britain
December 2, 1954

8 Claims. (Cl. 260—240)

This invention relates to cyanine dyes and particularly to cyanine dyes which contain a pyridazinine ring system. The invention further relates to photographic silver halide emulsions containing such dyes as optical sensitisers.

New pyridazine compounds of the general Formula I:

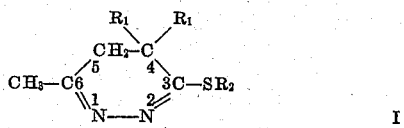

where the $R_1$ groups are hydrogen or methyl groups and $R_2$ is hydrogen or an alkyl group containing up to 4 carbon atoms, and the quaternary pyridazininium salts of said compounds in which $R_2$ is a said alkyl group, may be obtained:

(a) Where $R_2$ is hydrogen, by treating a corresponding compound containing a =O group in the 3-position with a phosphorus sulphide (e. g. phosphorus pentasulphide in an inert solvent such as xylene), the starting materials being made, for example, by reacting hydrazine with a compound of the general formula $$CH_3CO \cdot CH_2 \cdot C(R_1)_2 \cdot COOH$$

The whole sequence of reactions can be set out as follows:

plus $H_2N-NH_2$

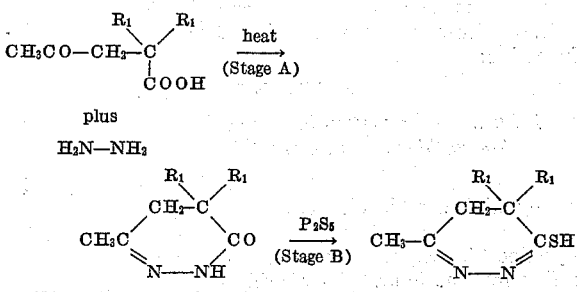

(b) Where $R_2$ is alkyl, by alkylating the products of (a) with an alkyl ester $R_2X$ (X being an acid residue):

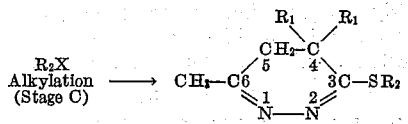

The product of stage C may be converted to a quaternary salt by reaction with an alkyl ester $R_3X$, the groups $R_3$ and X linking to the nitrogen atom in the 1-position.

The following are exemplary procedures of producing such compounds:

PROCEDURE A

*Preparation of 4:4:6-trimethyl-3-methylthio pyridazinine*

Stage A.—Preparation of 4:4:6-trimethyl-3-pyridazinone: Mesitonic acid (14 g.) was added to a solution of hydrazine sulphate (14 g.) in 10% aqueous sodium hydroxide (86.5 cc.). After refluxing for one hour, the solution was evaporated to dryness under reduced pressure and the residue extracted with hot ethanol (2 lots of 100 cc.). Evaporation of the ethanol left an oily solid which was then heated at 180° for five minutes. On cooling, the resulting oil solidified and was recrystallised from cyclohexane to give 4:4:6-trimethyl-3-pyridazinone as colourless needles, M. P. 97–8°.

Stage B.—Preparation of 4:4:6-trimethyl-3-mercaptopyridazinine: 4:4:6-trimethyl-3-pyridazinone (5.0 g.), phosphorus pentasulphide (8.0 g.) and xylene (50 cc.) were boiled under reflux for two hours. The mixture was cooled, the xylene removed by decantation and the remaining solid washed well with benzene. The combined xylene and benzene extracts were evaporated to leave a solid which was recrystallised from cyclohexane to give 4:4:6-trimethyl-3-mercaptopyridazinine as fine yellow needles, M. P. 90°. (Found: S, 20.5. $C_7H_{12}N_2S$ requires S, 20.5%.)

Stage C.—Preparation of 4:4:6-trimethyl-3-methylthiopyridazinine: 4:4:6-trimethyl-3-mercaptopyridazinine (16 g.) was dissolved in methanol (200 cc.) and 40% aqueous sodium hydroxide (10.2 cc.) and methyl iodide (7.0 cc.) added in that order. After boiling under reflux for 30 minutes the solution was evaporated to dryness and the residue extracted with benzene (3×50 cc.). Evaporation of the benzene left an oil which was distilled to give pure 4:4:6-trimethyl-3-methylthiopyridazinine as a pale yellow oil, B. P. 118–120 at 15 mm.

PROCEDURE B

*Preparation of 6-methyl-3-methylthiopyridazinine*

6-methyl-3-pyridazinone (11.2 g.) was dissolved in warm toluene (100 cc.) and phosphorus pentasulphide (22.2 g.) added to the resulting solution. After boiling under reflux for one hour, the toluene was decanted from a tarry solid and evaporated to give a crystalline residue. Recrystallisation of this residue from light petroleum (B. P. 100–120°) gave pure 6-methyl-3-mercaptopyridazinine as fine pale yellow needles, M. P. 127°.

6-methyl-3-mercaptopyridazine (6.0 g.) was dissolved in 4% aqueous sodium hydroxide (47 cc.) and methyl iodide (2.9 ml.) added. The mixture was shaken vigorously for one hour, and extracted with chloroform. Evaporation of the dried chloroform extracts in vacuo left 6-methyl-3-methylthiopyridazinine as a pale yellow oil which was sufficiently pure for further reaction.

PROCEDURE C

*Preparation of 3-ethylthio-4:4:6-trimethylpyridazinine*

Sodium (0.74 g.) was dissolved in ethanol (25 ml.) and 3-mercapto-4:4:6-trimethylpyridazinine (5 g.) added to the solution which was warmed under reflux while ethyl iodide (2.6 ml.) was added. After boiling for 30 minutes, the solution was evaporated to dryness and extracted with benzene (3×25 ml.). On distillation, the benzene extracts gave the product as a yellow oil, B. P. 125–30° at 20 mm.

PROCEDURE D

*Preparation of 1:4:4:6-tetramethyl-3-methylthiopyridazinium iodide*

4:4:6-trimethyl-3-methylthiopyridazinine (7.0 g.), dry ether (7.0 ml.) and methyl iodide (7.0 ml.) were mixed and left at room temperature for two days. The resulting pale yellow solid was separated by filtration and washed well with acetone. Recrystallisation from ethanol gave the pure salt as yellow needles, M. P. 213–4° (d).

The compounds of general Formula I, in which $R_2$ is alkyl, may be quaternised by any of the usual processes, e. g. reaction with an alkyl, hydroxyalkyl, or aralkyl salt or ester, $R_3X$. The quaternisation takes place at the nitrogen atom in the 1-position. Typical quaternary salts are the alkyl and aralkyl halides (chloride, bromide and iodide), sulphate, sulphamate, perchlorate or p-toluene sulphonate.

It has been found that the methyl group in the 6-position of the aforesaid compounds is reactive and that a valuable series of cyanine dyes can be made from the quaternary salts of such compounds in which $R_1$ is methyl.

According to the present invention there are provided cyanine dyes of the general Formulae II and III:

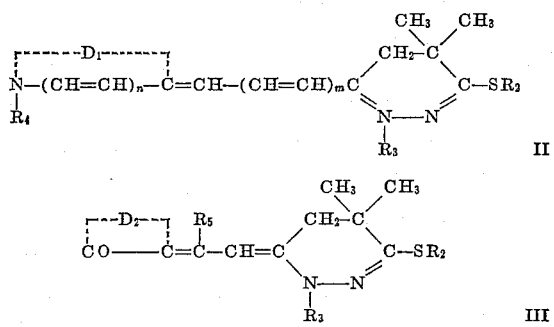

where $R_2$ is a lower alkyl group, $R_3$ is a lower alkyl or hydroxyalkyl group or an aralkyl group, $R_4$ is a lower alkyl or aralkyl group and $R_5$ is a hydrogen atom or a lower alkyl group, $n$ and $m$ are each nought or one, $D_1$ is the residue of a five-membered or six-membered heterocyclic nitrogen ring system, and $D_2$ is the residue of a ketomethylene nucleus.

The substituents $R_2$, $R_3$, $R_4$ and $R_5$ (where this last is not hydrogen) are preferably methyl or ethyl groups.

$D_1$ may be the residue of any five-membered or six-membered heterocyclic ring system including thiazoles, oxazoles, selenazoles and their polycyclic homologues such as those of the benzene and naphthalene series; pyridine and its polycyclic homologues, such as quinoline and α- and β-naphthoquinolines; indolenines; diazoles (e. g. 1:3:4-thiadiazole); thiazolines and pyridazinines. The polycyclic compounds of these series may be substituted in the carbocyclic rings with one or more groups such as alkyl, aryl, alkoxy and methylene dioxy groups, or by halogen atoms.

$D_2$ may be the residue of rhodanic acid (2-thio-4-ketotetrahydrothiazole), oxarhodanic acid (2-thio-4-keto-tetrahydrooxazole) and the N-hydrocarbon substituted derivatives of such compounds, oxazolones, pyrazole-5-ones and thiohydantoins.

According to a further feature of this invention, compounds of the said general formulae are prepared by condensing a compound of the general Formula IV:

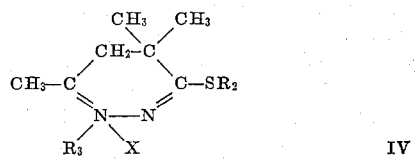

with a compound of either of the Formulae V and VI:

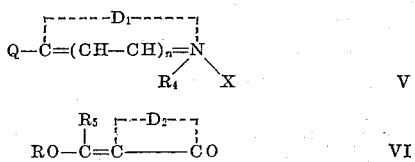

where Q is a thioether (SR), thioether vinyl $(-CH=CH-SR)$ or acetanilido vinyl group and R is a lower alkyl group.

In the foregoing Formula IV, X may be any acid radicle, for example halide (chloride, bromide, iodide), sulphate, sulphamate, perchlorate or p-toluene sulphonate.

Instead of starting with a compound of general Formula IV there may be used a compound of general Formula I in which the $R_1$ groups are methyl groups, together with a substantially equimolecular proportion of a quaternising salt $R_3X$.

Further, when a quaternary salt such as the p-toluene sulphonate is used, the quaternisation may be effected by fusing an alkyl p-toluene sulphonate with the compound of Formula I in which the $R_1$ groups are methyl groups. The reaction may also be effected by starting with a compound of the Formula I in which the $R_1$ groups are methyl groups, a compound of the Formula Va:

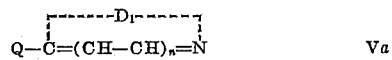

and at least two molecular proportions of such a quaternising salt.

Further, there may be used, instead of a compound of Formula VI a compound of Formula IVa:

together with a substantially equimolecular proportion of a lower alkyl ortho ester.

Further, by using two molecular proportions of a compound of Formula IV together with a molecular proportion of an alkyl orthoformate, symmetrical dyes containing two pyridazinine nuclei are obtained.

The dyestuffs obtained, and particularly those of Formula I, are valuable sensitisers for photographic gelatino silver halide emulsions and may be used for that purpose in the manner of sensitising dyes well known per se. Their activity is very surprising since corresponding dyes made from the analogous pyridazine compounds of the Formula VII:

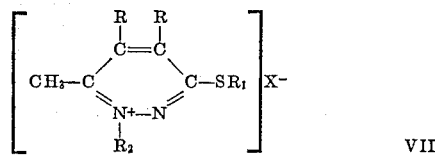

have no sensitising action in such emulsions.

The following examples will serve to illustrate the invention:

EXAMPLE 1

(1:4:4-trimethyl-3-methylthio-6-pyridazinine) (3-methyl-2-enzothiazole) monomethincyanine iodide 4:4:6-trimethyl-3-methylthiopyridazinine (0.27 g.), 2-methylthiobenzothiazole (0.29 g.) and methyl p-toluene sulphonate (0.60 g.) were fused for one hour at 130°, pyridine (4.0 cc.) was added and the solution boiled under reflux for one hour. On pouring into 2% aqueous potassium iodide (20 cc.) a solid was precipitated which was filtered off and recrystallised from methanol to give the pure dye as glistening orange leaflets, M. P. 266°. The dye extends the sensitivity of a silver chloride emulsion to 4900 A. with a maximum at 4650 A.

EXAMPLE 2

(1:4:4-trimethyl-3-methylthio-6-pyridazinine) (3-ethyl-2-benzoxazole) trimethincyanine iodide 4:4:6-trimethyl-3-methylthiopyridazinine (0.28 g.) and methyl p-toluene sulphonate (0.31 g.) were fused at 130° for 15 minutes. Pyridine (5 cc.) and 2-2'-acetanilidovinylbenzoxazole ethiodide (0.72 g.) were added, the solution boiled for one hour and poured into 3% aqueous sodium iodide (50 cc.) to precipitate a solid. Recrystallisation of the filtered solid from ethanol gave the pure dye as purple plates, M. P. 251°.

This dye extends the sensitixity of a silver iodobromide emulsion to 5800 A. with a maximum at 5450 A.

EXAMPLE 3

(1:4:4-trimethyl-3-methylthio-6-pyridazinine) (3-ethyl-2-benzothiazole) trimethincyanine iodide 4:4:6-trimethyl-3-methylthiopyridazinine (0.28 g.) and methyl p-toluene sulphonate (0.31 g.) were fused at 130° for 15 minutes. Pyridine (5 cc.) and 2-2'-acetanilidovinylbenzothiazole ethiodide (0.76 g.) were added, the solution boiled under reflux for one hour and poured into 3% aqueous sodium iodide (50 cc.) to precipitate a solid. Recrystallisation of this solid gave the pure dye as dark purple plates, M. P. 259°.

This dye extends the sensitivity of a silver iodobromide emulsion to 6300 A. with a maximum at 5900 A.

EXAMPLE 4

(1:4:4-trimethyl-3-methylthio-6-pyridazinine) (1:3:3-trimethyl-2-indolenine) trimethincyanine iodide 1:4:4:6-tetramethyl-3-methylthiopyridazininium iodide (0.78 g.), 2-2'-acetanilidovinyl-3:3-dimethylindolenine methiodide (1.11 g.) and pyridine (10 ml.) were boiled under reflux for 1 hour. On pouring into water (80 ml.) a solid was precipitated which, after cooling to 0°, was filtered off and recrystallised from ethanol to give the pure dye as deep blue rhombic crystals, M. P. 254° (d).

This dye extends the sensitivity of a silver iodobromide emulsion to 6000 A with a maximum at 5700 A.

EXAMPLE 5

5-(1:4:5:6-tetrahydro-1:4:4-trimethyl-3-methylthio-6-pyridazinylidene) ethylidene-3-ethyl-2-thiothiazolid-4-one 1:4:4:6-tetramethyl-3-methylthiopyridazininium iodide (0.78 g.), 5-ethoxymethylene-3-ethylrhodanic acid (0.53 g.), ethanol (10 ml.) and triethylamine (1.0 ml.) were boiled under reflux for one hour. On pouring into water (80 ml.) a solid was precipitated which was filtered off, washed with dilute aqueous triethylamine and recrystallised from ethanol to give the dye as red needles, M. P. 182°.

This dye extends the sensitivity of a silver iodobromide emulsion to 6350 A. with a maximum at 5800 A.

EXAMPLE 6

4-(1:4:5:6-tetrahydro-1:4:4-trimethyl-3-methylthio-6-pyridazinylidene) isopropylidene-3-methyl-1-phenylpyrazol-5-one 1:4:4:6-tetramethyl-3-methylthiopyridazinium iodide (0.62 g.), 3-methyl-1-phenyl-5-pyrazolone (0.35 g.), ethyl orthoacetate (1.0 ml.) and pyridine (10 ml.) were heated on a water bath for 30 minutes to give an orange red solution. On pouring into water (50 ml.) a solid was precipitated which was filtered off and recrystallised from methanol to give the pure dye as red needles, M. P. 180–1°.

EXAMPLE 7

(1-ethyl-4:4-dimethyl-3-methylthio-6-pyridazinine) (3-ethyl-2-benzoxazole) monomethincyanine perchlorate.

4:4:6-trimethyl-3-methylthiopyridazinine (0.34 g.), 2-methylbenzoxazole (0.34 g.) and ethyl p-toluene sulphonate (0.80 g.) were fused at 140° for 1 hour. Pyridine (10 ml.) was added and the solution boiled under reflux for 1 hour. On pouring into 4% aqueous sodium perchlorate, a sticky solid was precipitated which was washed with ether to harden it and finally recrystallised from ethanol to give the pure dye as orange plates, M. P. 223°.

This dye extends the sensitivity of a silver chloride emulsion to 4550 A. with a maximum at 4350 A.

EXAMPLE 8

Bis(1:4:4-trimethyl-3-methylthio-6-pyridazinine) trimethincyanine iodide

1:4:4:6-tetramethyl-3-methylthiopyridazininium iodide (1.2 g.), ethyl orthoformate (1.5 ml.) and pyridine (5 ml.) were boiled under reflux for 45 minutes. On pouring into water (50 ml.) a solid was precipitated which was recrystallised from methanol to give the pure dye as deep purple needles, M. P. 282° (d).

This dye extends the sensitivity of a silver iodobromide emulsion to 6100 A. with a maximum at 5800 A.

EXAMPLE 9

(1:4:4-trimethyl-3-methylthio-6-pyridazinine) (1-methyl-4-quinoline) trimethincyanine iodide 1:4:4:6-tetramethyl-3-methylthiopyridazininium iodide (0.62 g.), 4-2'-ethylthiovinylquinoline methiodide (0.72 g.) and pyridine (5 ml.) were boiled under reflux for 30 minutes to give a deep blue solution. On pouring into water a solid was precipitated which was filtered off and recrystallised from methanol to give the pure dye as deep green plates, M. P. 267° (d).

This dye extends the sensitivity of a silver iodobromide emulsion to 6900 A. with a maximum at 6500 A.

The following dyes were prepared by analogous processes to those described above.

By the method of Example 1:

EXAMPLE 10

(1.4.4-trimethyl-3-methylthio-6-pyridazinine) (1-methyl-4-quinoline) monomethincyanine perchlorate from methanol as purple needes, M. P. 228–30°.

EXAMPLE 11

(1:4:4-trimethyl-3-methylthio-6-pyridazinine) (6:7-benzo-3-methyl-2-benzothiazole) monomethincyanine iodide from methanol as orange red needles, M. P. 228°.

This dye extends the sensitivity of a silver chloride emulsion to 5150 A. with a maximum at 4800 A.

EXAMPLE 12

(1:4:4-trimethyl-3-methylthio-6-pyridazinine) (3-methyl-5-methylthio-2-1:3:4-thiadiazole) monomethincyanine perchlorate from methanol as orange plates, M. P. 184°.

This dye extends the sensitivity of a silver chloride emulsion to 4850 A. with a maximum at 4550 A.

By the method of Example 2:

EXAMPLE 13

(1:4:4-trimethyl-3-ethylthio-6-pyridazinine) (3-ethyl-2-benzoxazole) trimethincyanine iodide from ethanol as blue rhombic crystals with a red reflex, M. P. 247° (d).

This dye extends the sensitivity of a silver iodobromide emulsion to 5850 A. with a maximum at 5500 A.

By the method of Example 4:

EXAMPLE 14

(1:4:4-trimethyl-3-ethylthio-6-pyridazinine) (3-ethyl-2-benzothiazole) monomethincyanine iodide as orange needles from ethanol, M. P. 259°.

This dye extends the sensitivity of a silver chloride emulsion to 4950 A. with a maximum at 4700 A.

EXAMPLE 15

(1:4:4-trimethyl-3-methylthio-6-pyridazinine) 5-chloro-3-ethyl-2-benzothiazole trimethincyanine iodide from methanol as small green needles, M. P. 268° (d).

This dye extends the sensitivity of a silver iodobromide emulsion to 6200 A. with a maximum at 5900 A.

EXAMPLE 16

(1:4:4-trimethyl-3-methylthio-6-pyridazinine) (3-ethyl-6-methoxy-2-benzoxazole) trimethincyanine iodide as purple rhombic crystals from ethanol, M. P. 240°.

This dye extends the sensitivity of a silver iodobromide emulsion to 5950 A. with a maximum at 5600 A.

EXAMPLE 17

(1:4:4-trimethyl-3-methylthio-6-pyridazinine) (3-ethyl-5-phenyl-2-benzoxazole) trimethincyanine iodide from methanol as green micro needles, M. P. 256°.

This dye extends the sensivity of a silver iodobromide emulsion to 5950 A. with a maximum at 5600 A.

EXAMPLE 18

(1:4:4-trimethyl-3-methylthio-6-pyridazinine) (3-ethyl-5:6-dimethyl-2-benzoxazole) trimethincyanine iodide from methanol as purple leaflets, M. P. 271°.

This dye extends the sensitivity of a silver iodobromide emulsion to 5950 A. with a maximum at 5600 A.

EXAMPLE 19

(1:4:4-trimethyl-3-methylthio-6-pyridazinine) (1-ethyl-2-quinoline) monomethincyanine perchlorate from methanol as orange plates, M. P. 234°.

By the method of Example 5:

EXAMPLE 20

4-(1:4:5:6-tetrahydro-1:4:4-trimethyl - 3 - methylthio-6-pyridazinylidene) ethylidene-2-phenyl-5-oxazolone as brown needles with a blue reflex from ethanol, M. P. 194°.

This dye extends the sensitivity of a silver iodobromide emulsion to 5500 A. without a pronounced new maximum.

EXAMPLE 21

5-(1:4:5:6-tetrahydro-1:4:4-trimethyl - 3 - methylthio-6-pyridazinylidene)-1:3-dimethyl-4-oxo - 2 - thioiminazolidine as red needles from ethanol, M. P. 231°.

By the method of Example 6:

EXAMPLE 22

4-(1:4:5:6-tetrahydro-1:4:4-trimethyl - 3 - methylthio-6-pyridazinylidene) ethylidene-3-methyl-1-phenyl-5-pyrazolone from methanol as orange needles, M. P. 175–6°.

This dye extends the sensitvity of a silver chloride emulsion to 5500 A. with a maximum at 5200 A.

What we claim is:

1. A cyanine dye of one of the general formulae:

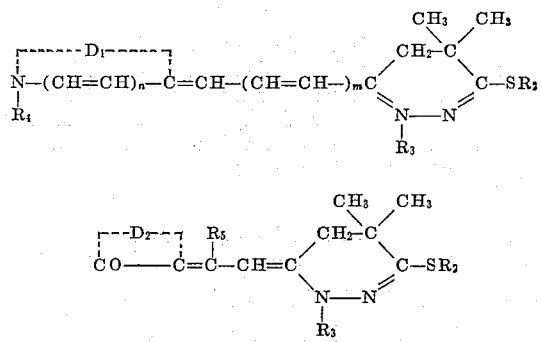

where $R_2$ is a lower alkyl group, $R_3$ is a group selected from the class consisting of alkyl and hydroxyalkyl groups containing up to 4 carbon atoms and benzyl groups, $R_4$ is a group selected from the class consisting of alkyl groups containing up to 4 carbon atoms and benzyl groups and $R_5$ is selected from the class consisting of the hydrogen atom and alkyl groups containing up to 4 carbon atoms, $n$ and $m$ are each selected from nought and one, $D_1$ is a residue selected from the class consisting of the following five-membered and six-membered heterocyclic nitrogen ring systems: thiazole, oxazole and selenazole; benzo- and naphthothiazole, -oxazole and -selenazole; pyridine; quinoline; α-naphthoquinoline; β-naphthoquinoline; indolenine; diazole; thiazoline; pyridazinine; and halogen-, alkyl-, aryl-, alkoxy- and methylene dioxy-carbocyclic-ring-substituted derivatives of such of the foregoing radicals as contain a carbocyclic ring structure, and $D_2$ is the residue of a keto-methylene nucleus selected from the class consisting of rhodanic acid; oxarhodanic acid; the N-alkyl substituted derivatives of rhodanic acid and oxarhodanic acid; oxazolone, pyrazole-5-one and thiohydantoin.

2. A process for the production of a cyanine dye which comprises heating together a compound of the general formula:

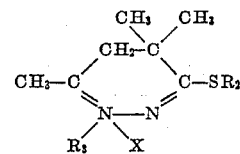

with a compound of either of the general formulae:

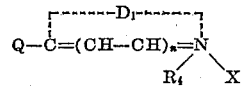

and

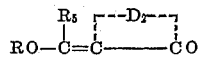

where Q is selected from the class consisting of thioether (SR), thioether vinyl (—CH=CH—SR) and acetanilidovinyl groups, R is a lower alkyl group, $R_2$ is a lower alkyl group, $R_3$ is a group selected from the class consisting of lower alkyl, lower hydroxyalkyl and benzyl groups, $R_4$ is a group selected from the class consisting of lower alkyl and benzyl groups, $R_5$ is selected from the class consisting of the hydrogen atom and a lower alkyl group, X is an acid radical, $n$ and $m$ are each selected from nought and one, $D_1$ is a residue selected from the class consisting of the following five-membered and six-membered heterocyclic nitrogen ring systems: thiazole, oxazole and selenazole; benzo- and naphthothiazole, -oxazole and -selenazole; pyridine; quinoline; α-naphthoquinoline; β-naphthoquinoline; indolenine; diazole; thiazoline; pyridazinine; and halogen-, alkyl-, aryl-, alkoxy- and methylene dioxy-carbocyclic-ring-substituted derivatives of such of the foregoing radicals as contain a carbocyclic ring structure, and $D_2$ is the residue of a keto-methylene nucleus selected from the class consisting of rhodanic acid; oxarhodanic acid; the N-alkyl substituted derivatives of rhodanic acid and oxarhodanic acid; oxazolone, pyrazole-5-one and thiohydantoin.

3. A process for the production of a symmetrical cyanine dye which comprises heating two molecular proportions of a compound of the general formula:

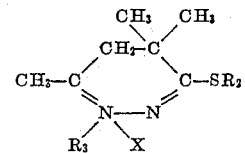

where $R_2$ and $R_3$ are lower alkyl groups and X is an acid radicle, together with a molecular proportion of an alkyl orthoformate.

4. The compound (1:4:4 - trimethyl - 3 - methylthio-6 - pyridazinine) (3 - ethyl - 2 - benzoxazole) trimethincyanine iodide.

5. The compound (1:4:4 - trimethyl - 3 - methylthio-6 - pyridazinine) (3 - ethyl - 2 - benzothiazole) trimethincyanine iodide.

6. The compound 5 - (1:4:5:6 - tetrahydro - 1:4:4 - trimethyl - 3 - methylthio - 6 - pyridazinylidene) ethylidene - 3 - ethyl - 2 - thiothiazolid - 4 - one.

7. The compound (1:4:4 - trimethyl - 3 - ethylthio - 6 - pyridazinine) (3 - ethyl - 2 - benzothiazole) monomethincyanine iodide.

8. The compound (1:4:4 - trimethyl - 3 - methylthio - 6 - pyridazinine) (3 - ethyl - 5 - phenyl - 2 - benzoxazole) trimethincyanine iodide.

References Cited in the file of this patent

UNITED STATES PATENTS

| | | |
|---|---|---|
| 2,020,636 | Dieterle et al. | Nov. 12, 1935 |
| 2,126,852 | Wolff et al | Aug. 16, 1938 |
| 2,196,162 | Muller et al. | Apr. 2, 1940 |
| 2,199,542 | Konig | May 7, 1940 |
| 2,472,565 | Brooker et al. | June 7, 1949 |
| 2,482,532 | Anish | Sept. 20, 1949 |